Feb. 15, 1927.

B. W. KING

SCALE

Filed July 31, 1924 5 Sheets-Sheet 3

1,617,851

INVENTOR.
Bert W. King
BY
Stuart C. Barnes
ATTORNEY.

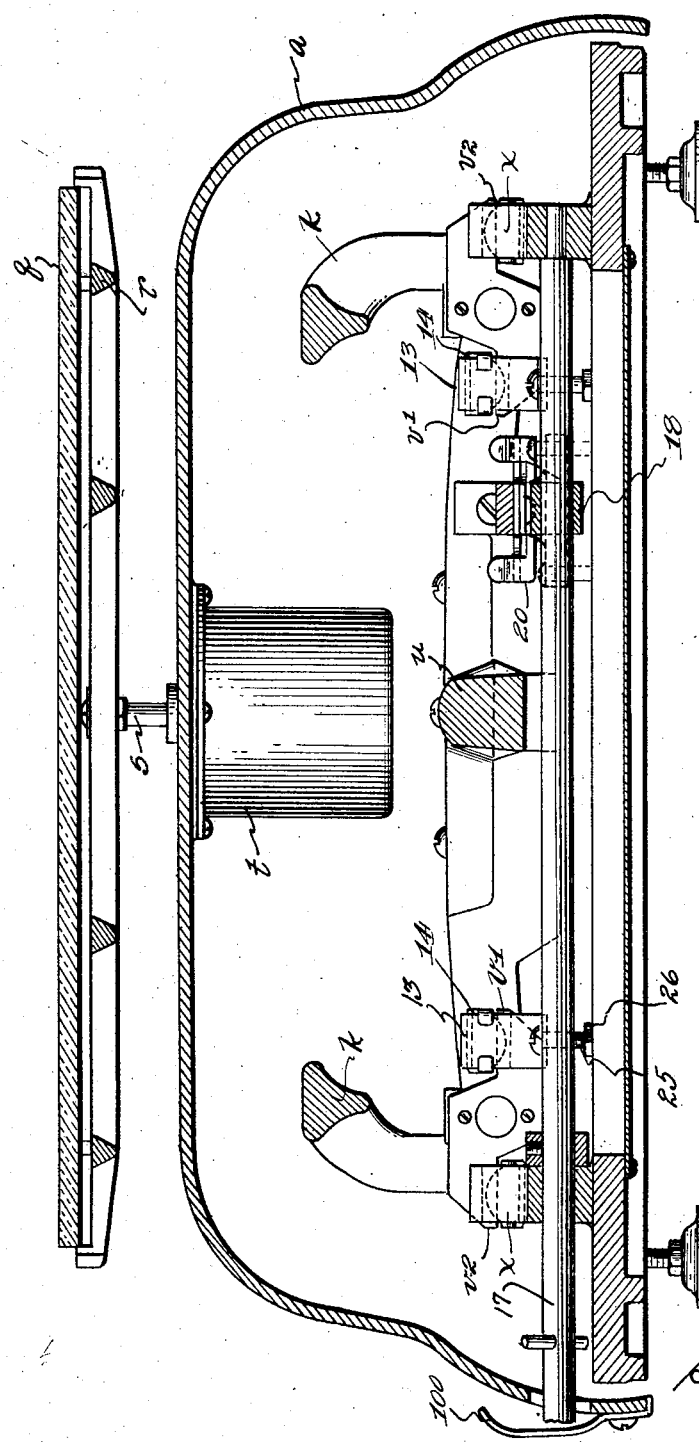

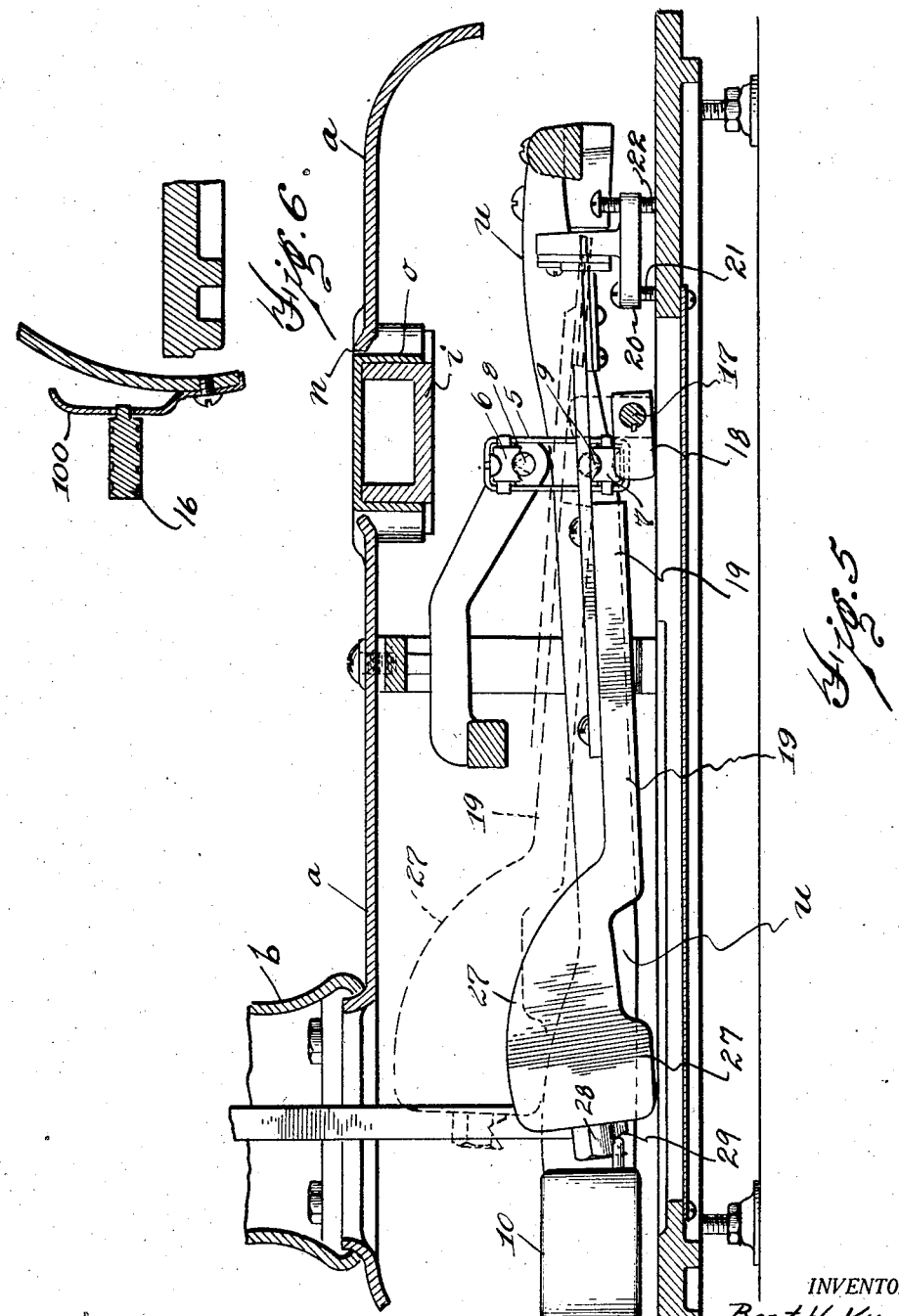

Patented Feb. 15, 1927.

1,617,851

UNITED STATES PATENT OFFICE.

BERT W. KING, OF DETROIT, MICHIGAN, ASSIGNOR TO BARNES SCALE COMPANY, OF DETROIT, MICHIGAN, A CORPORATION OF MICHIGAN.

SCALE.

Application filed July 31, 1924. Serial No. 729,212.

This invention relates to pendulum scales, particularly pendulum scales of the fan type.

It involves a novel organization of levers of the first order in connection with double knife edge pivots. It is not broadly new to use a lever system in which the main levers are of the first order, especially in a platform scale, but it is believed that the use of levers of the first order in connection with a counterweight attached to one of them has never been found practical. There is a tendency for the counterweight to shift or lift the lever fulcrum from its support. This trouble has been overcome in the present lever system by provision of means to prevent this action.

Another feature of this improvement is the employment of an extra capacity weight and special means by which the same may be applied to the counterweighted lever. The device to increase the capacity of the scale here is another feature which will be more fully described hereinafter.

In the drawings:

Fig. 4 is a section on the line 4—4 of Fig. 2.

Fig. 5 is a section on the line 5—5 of Fig. 2.

Fig. 6 is a section on the line 6—6 of Fig. 1.

The scale is provided with the usual base housing $a$ and the upright housing $b$, the latter of which houses a pendulum $c$, the eccentric $d$ and the tape $e$. However, these features are no part of the invention, which resides in the lever system. The usual dial $f$ is provided, over which oscillates the indicator hand $g$.

Figure 3:
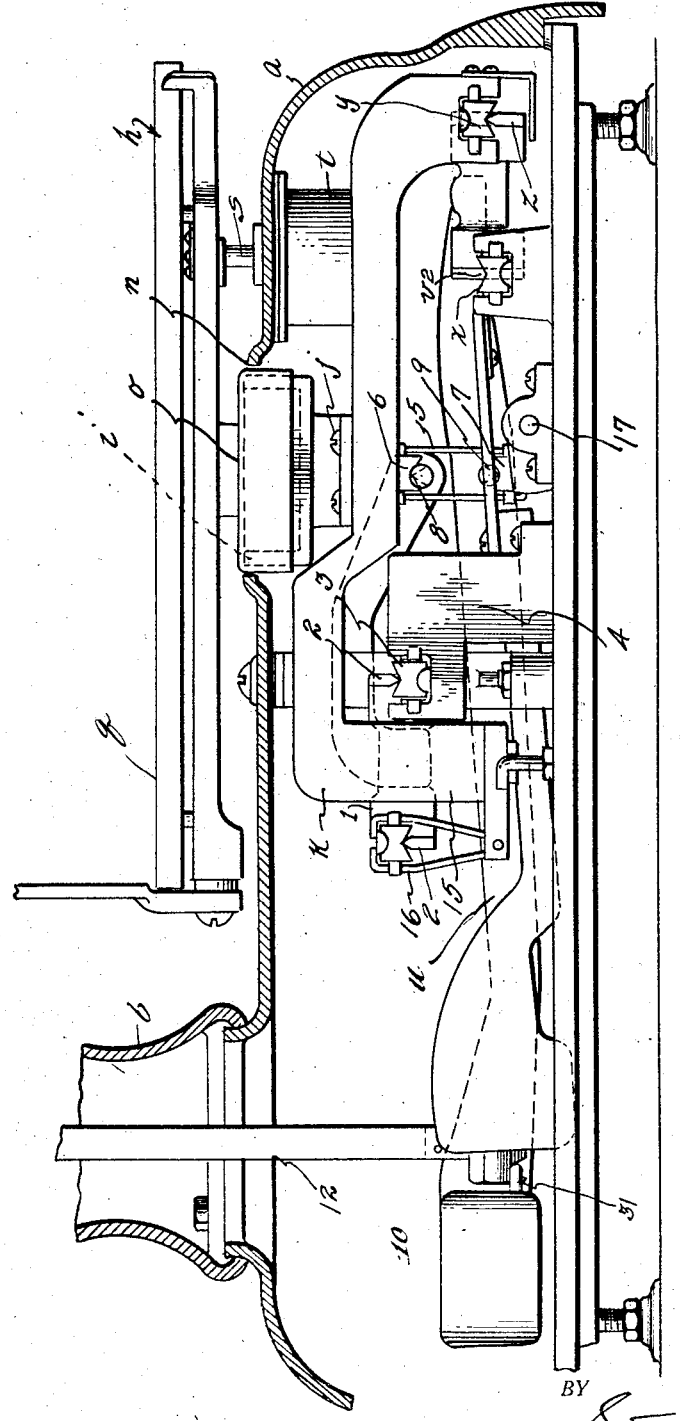
Fig. 3 is a side elevation of the lever system.

A platform $h$ is supported on a saddle $i$. This saddle is secured by screws $j$ to two platform supporting bars $k$; this forms a sort of H platform supporting frame with the saddle located in the opening $n$ in the top of the housing $a$. The platform is provided with a depending elliptical cup $o$ which can fit over this saddle, as will be seen from Fig. 3. The platform frame is in the form of a sort of grid $r$ in which rests the platform slab of glass $q$. This grid $r$ is secured to the plunger rod $s$ of the dash pot $t$.

The lever system comprises a counterweighted lever $u$ of the first order, being provided with knives $v$ which are supported in the agate blocks $x$. The load is applied to the lever $u$ by the agate blocks $y$ on the bottom of the platform supporting bars engaging the knife edges $z$. The other lever of the first order is designated 1 and is fulcrumed by the knife edges 2, in the agate bearings 3, supported in the inverted L blocks 4. Both of these levers are in general configuration T shape. Near the center of the scale, the two levers are located one above the other and connected by the link 5 which is provided with suitable agate bearings 6 and 7, which engage with the knife edges 8 and 9.

The counterweight is located on the lever $u$ and is designated 10. Secured to this is a bracket 11 which has a connection 12 with a ribbon $e$ which runs over the eccentric. By this arrangement of the levers the counterweight is placed at the extreme rear of the scale, even beyond the connection with the eccentric. The scale housing from front to back is slightly lengthened to the rear of the usual upright $b$, as clearly indicated in Fig. 3, to accommodate this counterweight. The counterweight being located in this extreme position is at a considerable distance from the fulcrum and consequently has the necessary moment to counterbalance the mechanism without being a relatively heavy member. However, counterweights used in connection with levers of the first order are very unsatisfactory, for instead of having a tendency to hold the knife edge against its fulcrum they have just the opposite tendency to lift it out, and we have found that they are so unreliable as to be impractical without some means to correct this fault. We correct the difficulty by providing the knife edge member $v$ with an upwardly directed knife edge $v^1$, as well as the downwardly directed knife edge $v^2$. These knife edges are, of course, directly in line, as is plainly shown in Fig. 4. This upwardly directed knife edge $v^1$ engages with the agate block 13, supported in the clips 14.

This provides the counterweighted lever of the first order with a double knife edge fulcrum which easily holds it down, yet provides a minimum of friction.

It will be noticed that the platform supporting bars $k$ have at their rear ends the drop portions 15, which permits the platform bars at the rear ends to be suspended by links 16 from the lever 1. This forms a floating bearing at this point which together with the floating bearing formed by the link 5, where the levers are connected, is all that is necessary to permit the levers in the lever system to move in their particular arcs.

Figure 1:
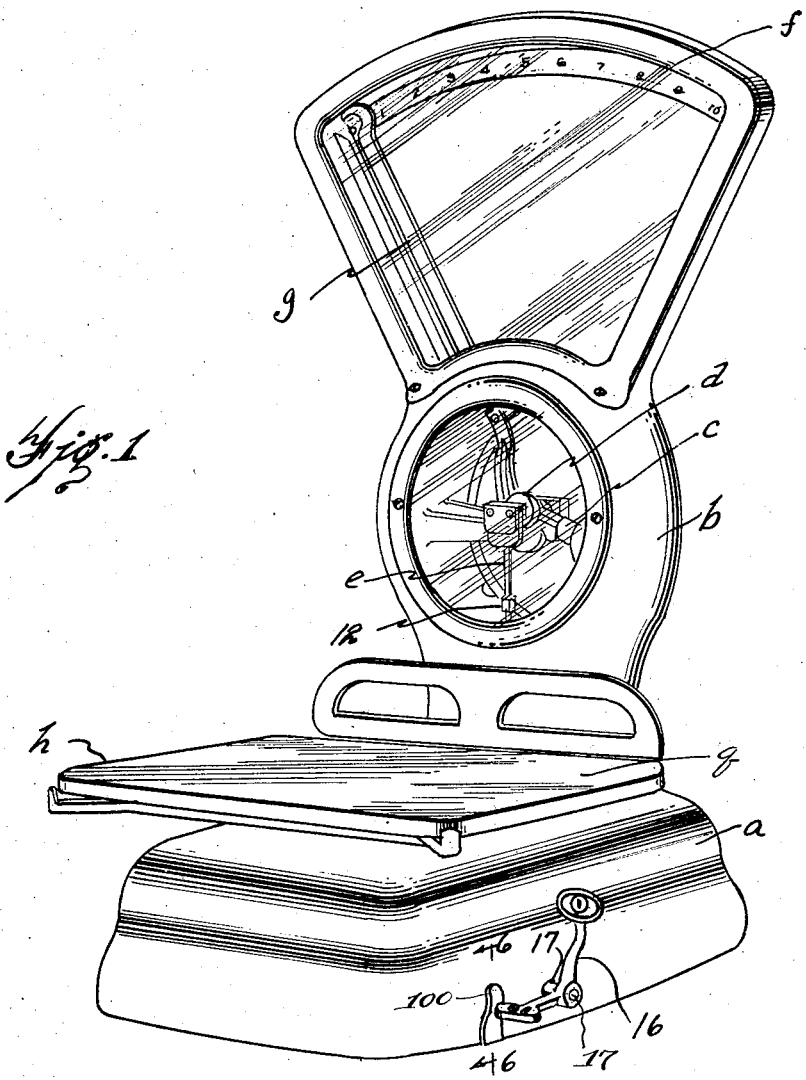
Fig. 1 is a perspective of the scale.
Figure 2:
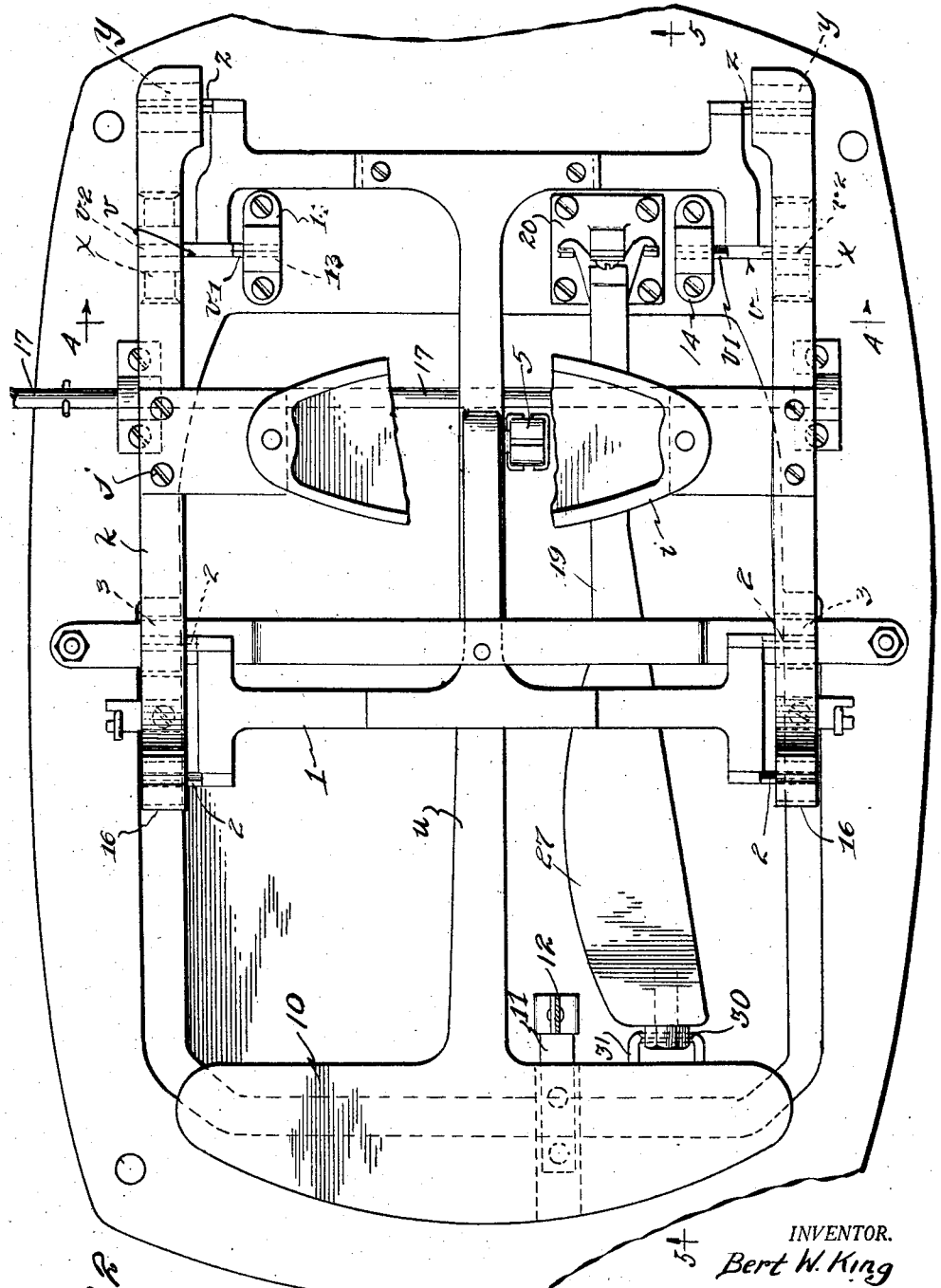
Fig. 2 is a plan view of the lever system.

In a fan scale it is desirable to increase the capacity. This we accomplish in a simple way by simply throwing the double crank 16 (Fig. 1). This is connected to a rock shaft 17 which passes into the scale housing and there is fastened thereon a cam 18. This cam 18, (Fig. 5) is adapted to engage under the extra capacity lever 19, which is fulcrumed on the standard 20 in much the same way that modern check levers are fulcrumed, namely, by a pair of plates which are ground or cut to provide suitable knife edges. This gives a line bearing which must absolutely line up with the double knife edge bearings already described in connection with the main counterweighted lever. In order to get these absolutely in alignment the bearings must be adjustable. It will be seen that the standard 20 is adjustable by means of the two screws 21 and 22 and also the clips 14, which are adjustable by reason of the machine screws 25 and the lock nuts 26.

The free end of this lever is counterweighted as at 27. A projecting cap screw 28 is provided with a V groove 29, which is adapted to fit over the knife edge 30 formed on a loop 31, projecting from the main counterweight. By simply throwing the double crank 16 down on one side or the other, it is possible to operate the cam 18 to either lift or let the extra capacity lever down so that it either relieves the main counterweight of the extra counterweight, or else adds the extra counterweight. By providing the double crank shaft arm arrangement, as shown in 16, the shift may always be made by pressing down, which is a small convenience. The spring 100 locks the crank in the position shown in Fig. 1.

What I claim is:

1. In a scale, a system of levers for supporting the platform comprising a pair of inter-connected levers of the first order one of which operates a counterweight and is supported to rock on an open fulcrum, and means for preventing the action of the counterweight from shifting the lever fulcrum.

2. In a scale, a system of levers comprising a pair of inter-connected levers of the first order supported on open fulcrums and including a double knife edge pivot and an upper and lower bearing therefor.

3. In a scale, a lever connected with a counterbalancing weight and directly supported on an open fulcrum, and means for preventing the lever from rising from said point of support on said fulcrum.

4. In a scale, a lever having a counterbalancing weight on one end and supported by a knife edge in a V block, and means for preventing the knife from jumping out of the bearing block, including a second knife edge aligned with the first knife edge, and a V bearing above said knife edge.

5. In a scale, a system of levers including a counterweighted lever of the first order, having an open fulcrum support, a second bearing aligned with the first bearing and having its members inverted for preventing the lever shifting in the first bearing, and an extra capacity lever having a fulcrum in line with the two first-mentioned bearings.

6. In a scale, a system of levers including the counterweighted lever of the first order, having on open fulcrum support, a second bearing aligned with the first bearing, and having its members inverted for preventing the lever shifting in the first bearing, and an extra capacity lever having a fulcrum in line with the two first-mentioned bearings, two of said fulcrums and bearings being adjustable to line up with the third.

7. In a scale, a system of levers, having in combination with a platform, one relatively long lever of the first order for supporting one end of the platform and reaching beyond the other end of the platform for connection with an indicating device, and a relatively short lever of the first order having a floating bearing connection with said other end of the platform for suspending same and having its length confined wholly within the extremities of the first mentioned lever, said levers being linked together at a point between their fulcrums.

8. In a scale, a system of levers, having in combination with a platform one relatively long lever of the first order for fulcruming thereon the platform at one end thereof and reaching beyond on the other end of the platform, an indicating device connected with and operated by such extended end of the said lever, and a relatively short lever of the first order with which said other end of the platform has a suspended link support, said second lever being contained wholly within the extremities of the first lever and being linked thereto adjacent the center of the platform.

9. In a scale, a system of levers including a counterweighted lever provided with a loop having a knife edge, an extra capacity lever provided with a cap screw with a groove adapted to be fitted over the knife edge of the loop, and means for dropping the same onto the knife edge or lifting it from the knife edge.

10. In a scale, a lever system including a plurality of levers properly fulcrumed and interconnected together, one of which has its resistance arm extending towards the outside of the scale and is provided with the usual draft connection, and a counterweight located immediately next to said connection.

11. In a scale, a lever system including a plurality of levers fulcrumed and interconnected together, one of which has its resistance arm extending toward the outside of the scale, and is provided with the usual draft connection, and a counterweight located immediately next to said connection but further toward the outside of the scale.

12. In a scale, a plurality of levers of the first order fulcrumed and interconnected together, one of which has on its extreme resistance end a counterweight end, also a draft connection for the resistance members of the scales.

13. In a scale, a lever system including a plurality of levers, an extra capacity weight, a housing in which said levers are shielded, and a double arm crank for controlling the extra capacity weight whereby the same may be shifted in either way by pressing down on the double arm crank.

14. In a scale, a plurality of levers, a housing for containing the same, an extra capacity lever for shifting extra weight onto one of the levers, a rock shaft for controlling said extra capacity lever, and a double arm crank supported on the rock shaft on the outside of the housing for controlling the extra capacity lever.

In testimony whereof I have affixed my signature.

BERT W. KING.